US011933908B2

(12) United States Patent
Kuo et al.

(10) Patent No.: US 11,933,908 B2
(45) Date of Patent: Mar. 19, 2024

(54) REPORTING OF INTEGRITY-RELATED INFORMATION FOR POSITIONING

(71) Applicant: Nokia Technologies Oy, Espoo (FI)

(72) Inventors: Ping-Heng Kuo, London (GB); Oana-Elena Barbu, Aalborg (DK); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/389,206

(22) Filed: Jul. 29, 2021

(65) Prior Publication Data

US 2022/0034992 A1 Feb. 3, 2022

Related U.S. Application Data

(60) Provisional application No. 63/058,734, filed on Jul. 30, 2020.

(51) Int. Cl.
*H04W 4/029* (2018.01)
*G01S 5/02* (2010.01)
*G01S 11/06* (2006.01)

(52) U.S. Cl.
CPC ............ *G01S 5/021* (2013.01); *G01S 5/0268* (2013.01); *H04W 4/029* (2018.02); *G01S 11/06* (2013.01)

(58) Field of Classification Search
CPC ... H04W 56/002; H04W 4/70; H04W 56/001; H04W 72/23; H04W 76/14; H04W 8/005; H04W 64/00; H04W 4/02; H04W 56/006
USPC ................ 455/456.1, 437, 404.2, 422.1
See application file for complete search history.

(56) References Cited

U.S. PATENT DOCUMENTS

| | | | | |
|---|---|---|---|---|
| 6,839,020 B2 * | 1/2005 | Geier | ..................... | G01S 19/50 342/357.64 |
| 6,978,328 B1 * | 12/2005 | Osaka | .................. | H05K 1/0228 365/63 |
| 8,717,235 B2 | 5/2014 | Alanen et al. | | |
| 10,080,098 B1 | 9/2018 | Edge | | |
| 2010/0190509 A1 * | 7/2010 | Davis | .................. | H04W 56/006 455/456.1 |
| 2011/0065457 A1 | 3/2011 | Moeglein et al. | | |
| 2011/0304506 A1 * | 12/2011 | Choi | ......................... | G01S 5/10 342/387 |
| 2012/0115518 A1 * | 5/2012 | Zeira | ..................... | H04W 8/005 455/500 |
| 2013/0271324 A1 * | 10/2013 | Sendonaris | ........... | G01S 5/0236 342/450 |

(Continued)

FOREIGN PATENT DOCUMENTS

| | | |
|---|---|---|
| CN | 106851583 A | 6/2017 |
| CN | 109392089 A | 2/2019 |

(Continued)

OTHER PUBLICATIONS

Tentative Rejection received for corresponding Taiwan Patent Application No. 110126631, dated Feb. 21, 2022, 22 pages of Tentative Rejection and 5 pages of translation available.

(Continued)

*Primary Examiner* — Joseph Arevalo
(74) *Attorney, Agent, or Firm* — ALSTON & BIRD LLP

(57) ABSTRACT

Systems, methods, apparatuses, and computer program products for reporting of integrity-related information for positioning are provided.

28 Claims, 9 Drawing Sheets

(56) References Cited

U.S. PATENT DOCUMENTS

| | | | |
|---|---|---|---|
| 2014/0140227 A1 | 5/2014 | Gao et al. | |
| 2019/0056510 A1 | 2/2019 | de Groot et al. | |
| 2019/0373572 A1 | 12/2019 | Cui et al. | |
| 2020/0053690 A1 | 2/2020 | Fischer et al. | |
| 2020/0137522 A1 | 4/2020 | Gummadi et al. | |
| 2020/0383004 A1* | 12/2020 | Hande | H04L 47/805 |
| 2021/0099832 A1 | 4/2021 | Duan et al. | |
| 2021/0127347 A1 | 4/2021 | Akkarakaran et al. | |
| 2022/0287132 A1* | 9/2022 | Zhang | H04W 76/19 |
| 2022/0417887 A1* | 12/2022 | Li | H04W 64/00 |

FOREIGN PATENT DOCUMENTS

| | | |
|---|---|---|
| CN | 110651512 A | 1/2020 |
| EP | 3282276 A1 | 2/2018 |
| WO | WO 2018/085017 A1 | 5/2018 |
| WO | WO 2019/096698 A1 | 5/2019 |
| WO | WO 2021/094605 A1 | 5/2021 |

OTHER PUBLICATIONS

"Report of email discussion [99bis#57][LTE/Positioning] Future phase support of SSR", 3GPP TSG-RAN WG2 Meeting #101, R2-1803142, Agenda: 9.8.2, u-blox AG, Feb. 26-Mar. 2, 2018, pp. 1-22.

Office action received for corresponding Bangladesh Patent Application No. 196/2021, dated Aug. 1, 2022, 2 pages.

"New SID on NR Positioning Enhancements", 3GPP TSG-RA3GPP TSG RAN Meeting #86, RP-193237, Agenda: 9.1.1, Qualcomm Incorporated, Dec. 9-12, 2019, 4 pages.

U.S. Appl. No. 63/004,005, "Conditional Measurement Reporting Mode For Positioning", filed Apr. 2, 2020, 70 pages.

"3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.6.0, Dec. 2019, pp. 1-8.

"Revised SID: Study on NR Positioning Enhancements", 3GPP TSG RAN Meeting #88e, RP-200928, Agenda: 9.1.1, CATT, Jun. 29-Jul. 3, 2020, 4 pages.

Destino et al., "A New Position Quality Metric for NR RAT Dependent OTDOA Positioning Methods", 16th Workshop on Positioning, Navigation and Communications (WPNC), Oct. 23-24, 2019, 5 pages.

International Search Report and Written Opinion received for corresponding Patent Cooperation Treaty Application No. PCT/EP2021/066979, dated Oct. 5, 2021, 13 pages.

"Broadcast of assistance data", 3GPP TSG-RAN WG2 Meeting #103, R2-1813167, Qualcomm Incorporated, Aug. 20-24, 2018, 15 pages.

"Motivation for SI on Integrity Support for NR Positioning", 3GPP TSG RAN Meeting #84, RP-190855, Agenda: 8, Swift Navigation, Jun. 3-6, 2019, 17 pages.

"Signalling for Positioning Integrity Support", 3GPP TSG-RAN WG2 Meeting #112 Electronic, R2-2009761, Agenda: 8.11.3.3, Nokia, Nov. 2-13, 2020, 4 pages.

Notice of Acceptance for Bangladesh Application No. 196/2021/1606 dated Aug. 16, 2023, 1 page.

Notice of Allowance for Taiwanese Application No. 110126631 dated Nov. 25, 2022, 3 pages.

First Examination Report for Indian Application No. 202347013276 dated Nov. 22, 2023, 7 pages.

Fraunhofer IIS et al., "UE-Aided Detection of Threat to GNSS Systems and Assistance Data Signaling", 3GPP TSG RAN WG2 Meeting #114 Electronic, R2-2105735, (May 19-27, 2021), 7 pages.

Swift Navigation, "[AT113-e][601][POS]—Integrity Text Proposal", 3GPP TSG-RAN WG2 Meeting #113-e, R2-2102092, (Jan. 25-Feb. 5, 2021), 20 pages.

* cited by examiner

REPORTING OF INTEGRITY-RELATED INFORMATION FOR POSITIONING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for reporting of integrity-related information for positioning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1:
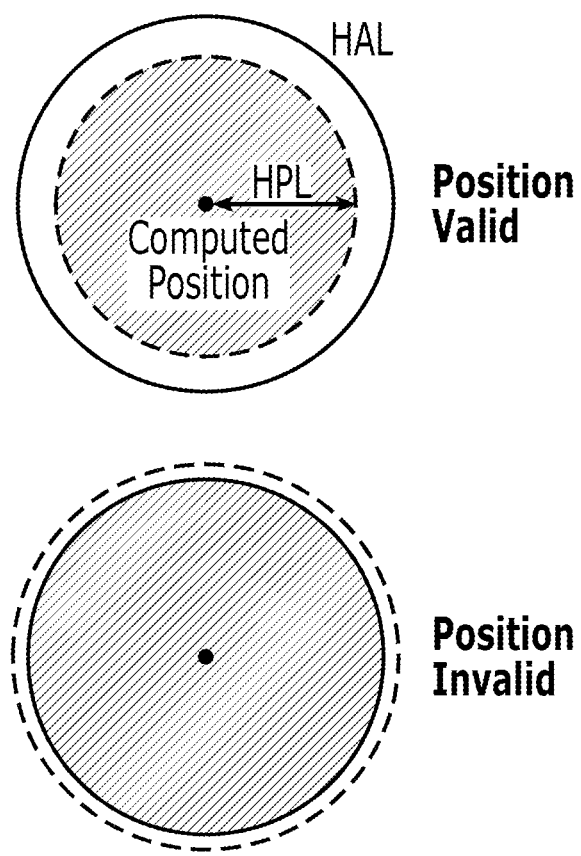
FIG. 1 illustrates an example diagram of valid and invalid positioning, according to one example.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reporting of integrity-related information for positioning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Positioning is one of the important enablers for various verticals and use cases that 5G aims to support. By obtaining the knowledge relating to the approximate or precise position of devices, applications such as location-based services, autonomous driving, and industrial IoT can be fulfilled by a 5G system. Although accurate positioning can typically be fulfilled by global navigation satellite system (GNSS) techniques such as global positioning system (GPS), these systems may not be able to provide positioning with sufficient accuracy for some indoor scenarios, such as factory automation or warehouse management. Thus, radio access technology (RAT)-dependent positioning methods based on downlink (DL)/uplink (UL) signals developed by 3GPP standards (e.g., positioning reference signal (PRS)/sounding reference signal (SRS)) have been studied in LTE/NR.

Emerging applications that rely on high-precision positioning technology, such as in autonomous applications (e.g., automotive), has resulted in the need for high integrity and reliability as well as high accuracy. It is noted that integrity refers to the measure of trust that can be placed in the accuracy of information supplied by a navigation system. Integrity may also include the ability of a system to provide timely warnings to receivers or UEs in case of failure. 5G service requirements may include the need to determine the reliability and the confidence level of position-related data. Therefore, 3GPP is investigating solutions for supporting the integrity and reliability of assistance data and position information. This may include identifying positioning integrity key performance indicators (KPIs) and relevant use cases, identifying error sources, threat models, occurrence rates and failure modes requiring positioning integrity validation and reporting, and studying methodologies for network-assisted and UE-assisted integrity.

In effect, integrity represents information relating to how much and/or how long the positioning estimation results can be trusted. It is noted that the integrity concept is an element for conventional positioning methods based on GNSS and it is also a system design aspect for applications that require accurate positioning (e.g. autonomous driving). In these contexts and others, several metrics relating to integrity have been identified. These metrics include alert limit (AL), protection level (PL), time to alert (TTA), integrity risk, and integrity event. AL refers to the maximum error the system can tolerate (depending on application). PL refers to an estimate of a maximum possible error in the position. In normal operation, PL is less than AL. TTA refers to the maximum allowable time elapsed from the onset of the navigation system being out of tolerance until the user equipment enunciates the alert. The integrity risk refers to the probability that the position error is larger than the AL, and the user is not warned within the TTA. A precondition here is the system availability (i.e., protection level lower than the alert limit). The integrity event (number of events per time unit) occurs when the positioning error is greater than the protection level, and the receiver does not trigger an alert within the TTA.

FIG. 1 illustrates PL and AL, which is shown as horizontal alert limit (HAL) in FIG. 1, according to one example. More specifically, FIG. 1 illustrates an example of valid and invalid positioning that takes AL and PL into account. In the example of FIG. 1, the computed position is considered as "valid" if its expected error (PL) is smaller than the maximum error it can tolerate (AL). Otherwise, the position is considered as "not trustable" and hence invalid.

It is noted that, although these metrics are defined in the context of positioning, how a positioning framework should support exchange information relating to positioning integrity has not been defined.

In the RAT-dependent positioning framework defined by 3GPP, a location server (e.g., LMF) is able to interact with gNB (or transmission/reception points (TRPs)) and UEs to carry out different positioning methods. Additionally, the location server can also interact with a client (e.g., application that requires positioning information) to determine how the positioning should be conducted in RAN. Apparently, depending on the application (e.g., for vehicle-to-everything (V2X) or for industrial IoT (IIoT)), the positioning requirement, such as the maximum error the system can tolerate (i.e. Alert Level), can be quite different.

It is noted that, as compared to the location server, RAN typically has better knowledge relating to many factors that affect the positioning integrity performance. For instance, the major source positioning error can be rooted from outdated positioning results due to device mobility and/or unsuitable radio propagation environment for positioning, e.g., lack of line of sight (LoS) paths.

Clearly, RAN has better visibility about these factors when the measurements are undertaken. However, when the location server is not aware of these factors, it does not know if the reported information is trustable, and it may end up with integrity risk if the discrepancy between the true UE position and the reported UE position is larger than the tolerable error. That is, the location server may still consider the position as valid and trustable even if the PL is actually larger than AL.

Figure 2:
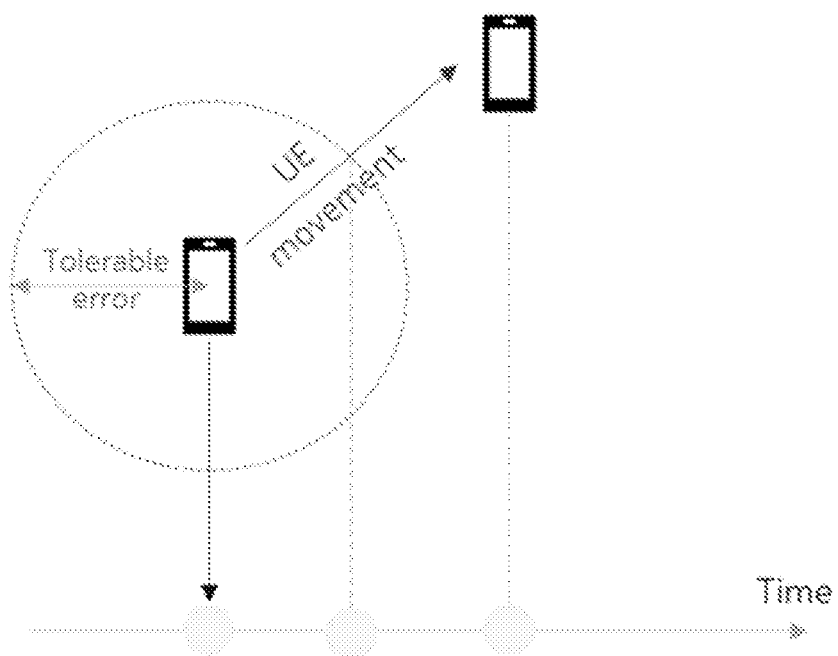
FIG. 2 illustrates an example diagram of an integrity risk caused by UE mobility, according to one example.

FIG. 2 illustrates an example of an integrity risk caused by UE mobility. As such, the example of FIG. 2 shows misusing of invalid positioning due to mobility. As illustrated in the example of FIG. 2, the estimated position has already become invalid as the UE moves out the range of maximum tolerable error, but such invalid position is still used by the LMF and even the client when it is no longer valid.

According to certain embodiments, a method is provided wherein the RAN nodes (e.g., gNB/UE) can derive information relating to whether a position estimation is trustworthy and/or how long it can be trusted. In an embodiment, a RAN node can derive this information on the trustworthiness of the position estimation based on its knowledge associated to the instantaneous status of the device (e.g., mobility, presence of LoS path, etc.), and some assistance information from the location server relating to integrity requirement (e.g., required AL of the positioning). Additionally, or alternatively, the RAN node could also take the perceived legitimacy of at least one other RAN node into account to derive this information (e.g. the position estimation may not be trustable if one of the RAN nodes assisting positioning is deemed to be malicious).

Figure 3:
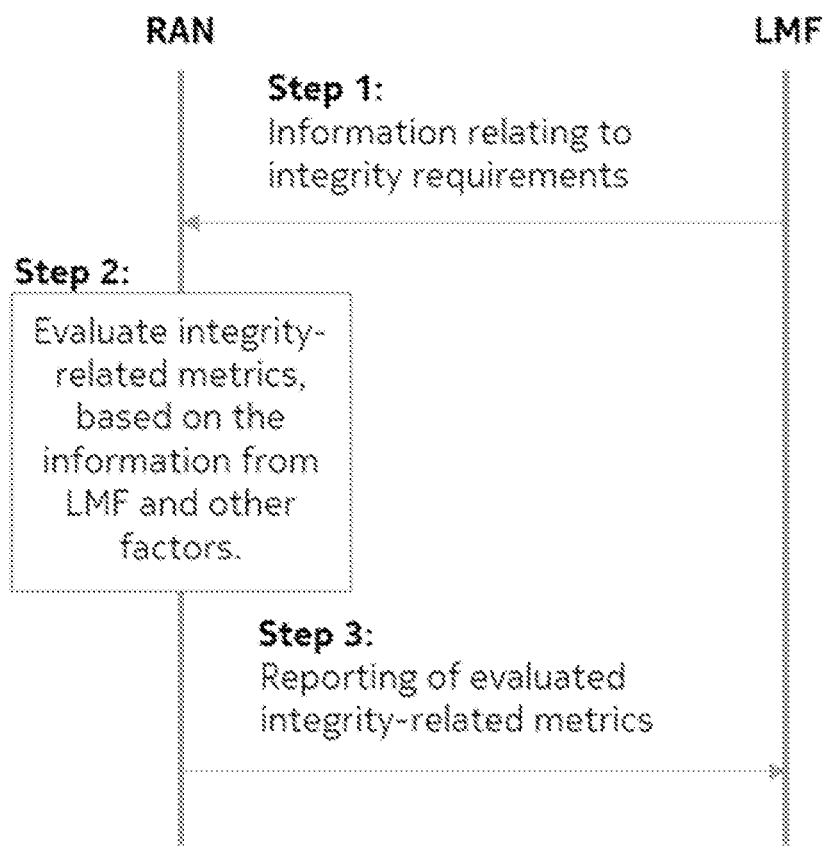
FIG. 3 illustrates an example signaling flow diagram, according to an embodiment.

FIG. 3 illustrates an example signaling diagram of a method, according to one embodiment. As illustrated in the example of FIG. 3, at step 1, a location server, such as a LMF, may provide positioning integrity requirement information to the RAN, e.g., to a gNB and/or UE. Thus, an embodiment includes a new signaling from the location server (e.g., LMF) to the RAN (e.g., gNB/UE) indicating at least one integrity requirement of the positioning session (e.g., Alert Limit), and/or request of at least one integrity metric that the RAN should report.

As further illustrated in the example of FIG. 3, at step 2, the RAN (e.g., gNB/UE) may evaluate the related integrity metrics, based on the positioning integrity requirement provided by the location server (e.g., LMF) and factors affecting the integrity of the positioning estimate, such as mobility of the UE, properties of radio propagation, and/or perceived legitimacy of one or more RAN nodes. The properties of radio propagation may include a presence or strength of LoS path. As such, in an embodiment, the RAN (e.g., gNB/UE) can derive at least one integrity metric that has been requested by the location server (e.g., LMF).

As also illustrated in the example of FIG. 3, at step 3, the RAN (e.g., gNB/UE) may report the evaluated metrics to the location server (e.g., LMF), possibly along with measurement reporting in case the position estimation is done at the location server (e.g., LMF). Thus, an embodiment provides a new signaling from the RAN (e.g., gNB/UE) to the location server (e.g., LMF) indicating the at least one derived integrity metric. In one embodiment, the signaling from the RAN, to the location server, may contain the expiry time (or validity duration) of the reported measurements. According to an embodiment, the signaling from the RAN, to the location server, may contain an indication on whether there is a risk with regards to the protection level. In an embodiment, the signaling from the RAN, to the location server, may contain information on potential reporting periodicity adjustments or reset. In one embodiment, the signaling from the RAN, to the location server, may contain location correction information along with the measurement reports.

Figure 4:
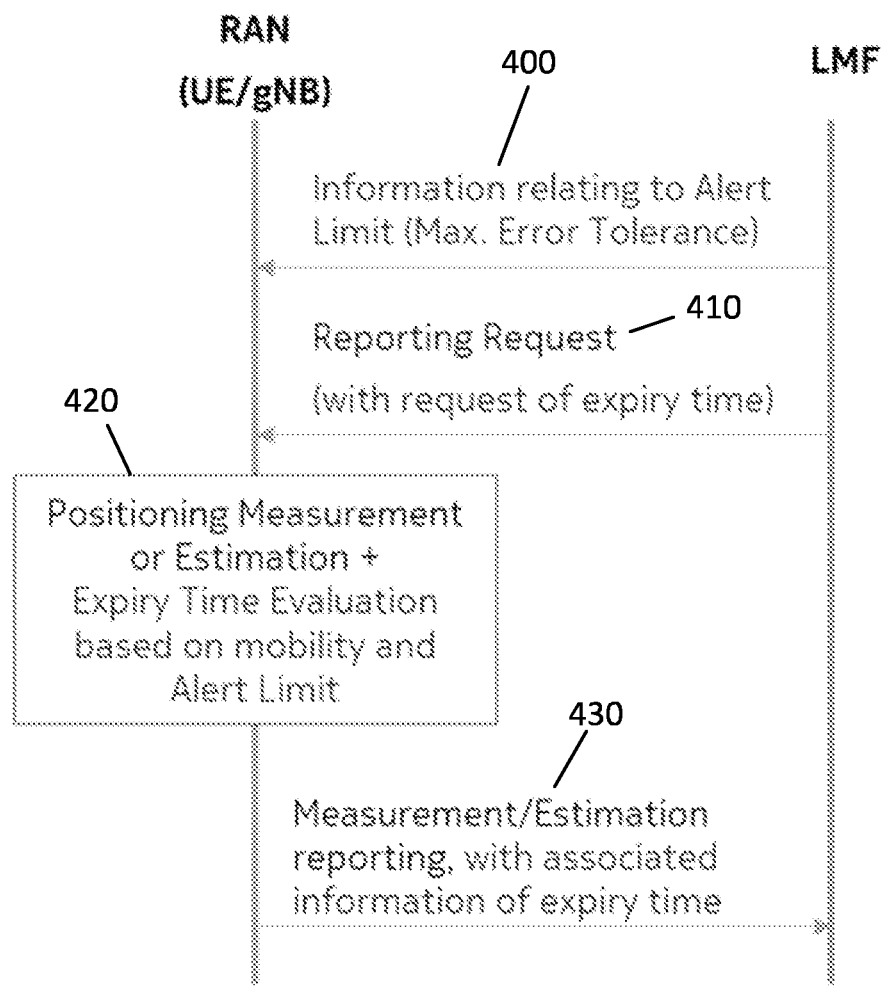
FIG. 4 illustrates an example signaling flow diagram, according to an embodiment.

One embodiment may be directed to a method for expiry-time reporting. In this embodiment, the UE/gNB may be able to evaluate how long the positioning estimation/measurement may remain valid (trustable) or how "confident" the report is at different points of time (i.e., being confident that the positioning error is smaller than the tolerance level), based on the UE mobility. Such information may be useful for the LMF to timely notify or alert the consumer (e.g. within the required TTA) when the positioning information is no longer useful or no longer trustable (i.e., expired because the UE would move out of the range of the alert limit by the time). FIG. 4 illustrates an example signaling flow diagram according to this embodiment.

As illustrated in the example of FIG. 4, at 400, the LMF may provide information relating to the AL of the client that needs the positioning information to the RAN. For example, the client may include an application requiring or requesting positioning information. In an embodiment, at 410, the LMF may also provide a reporting request with a request for expiry time, which essentially means how long the reported information can be considered trustable. Upon reception of such information, at 420, the RAN may perform measurement or position estimation, and derive the expiry time based on factors, such as UE mobility and propagation environment, as well as the alert limit provided by the LMF. As further illustrated in the example of FIG. 4, at 430, the RAN may report the position measurement/estimation and the derived expiry time to the LMF.

Figure 5:
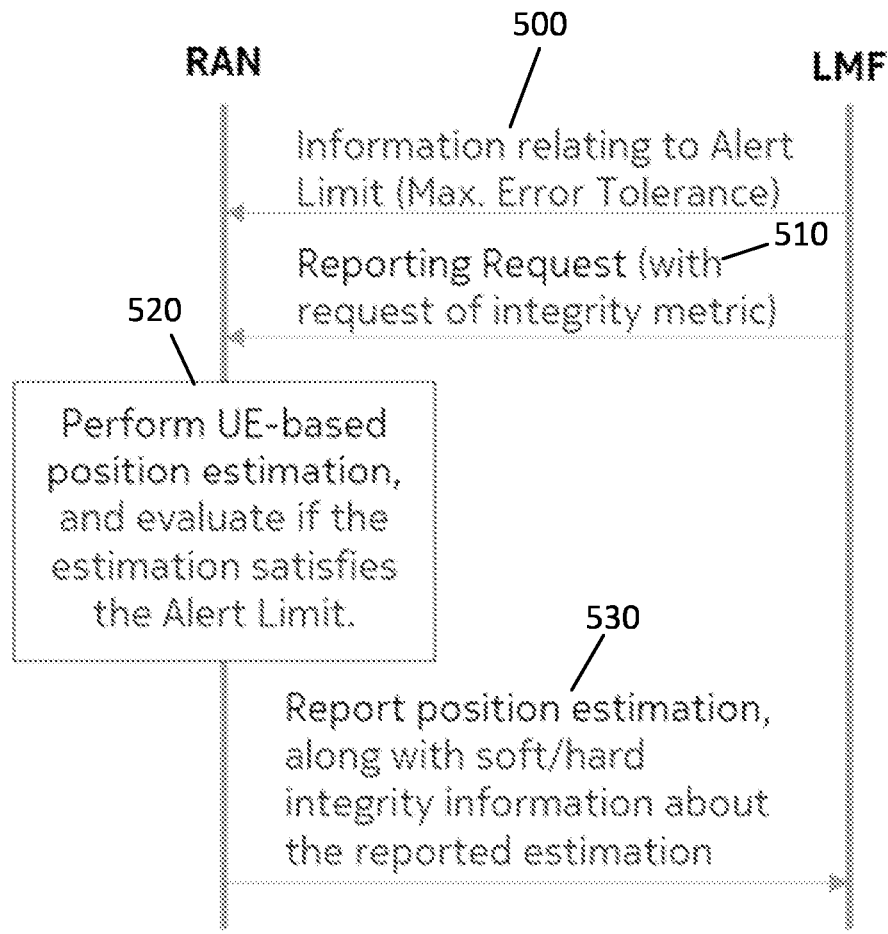
FIG. 5 illustrates an example signaling flow diagram, according to an embodiment.

An embodiment may be directed to a method for reporting of protection level and/or integrity risk likelihood. In this embodiment, the UE/gNB may be able to evaluate and report the protection level (PL) (i.e., an estimated error) directly. In this case, the LMF does not have to provide the alert limit (AL) as it could evaluate if there is an integrity risk by itself based on the PL reported by the RAN (gNB/UE). On the other hand, when the AL is provided by the LMF, the RAN can evaluate other metrics, such as a hard integrity metric or soft integrity metric. The hard integrity metric may include binary information regarding integrity risk, e.g., YES (1) or NO (0), for whether the estimation is valid considering the associated PL. The soft Integrity metric may include integrity risk probability, namely the likelihood that the estimation error is larger than the AL, i.e., p(estimation-error>AL) or p(PL>AL), where $p \in [0, 1]$. FIG. 5 illustrates an example signaling flow diagram according to this embodiment.

As illustrated in the example of FIG. 5, at 500, the LMF may optionally provide, to the RAN, information relating to the AL of the client that needs the positioning information to the RAN and, at 510, provide a request of certain "integrity metric". Upon reception of such information, at 520, the RAN may perform measurement or position estimation, and derive the requested integrity metric (e.g., PL, 1-bit information regarding whether the position estimation is valid, and/or the likelihood of integrity risk) based on the factors such as UE mobility and propagation environment, as well as the alert limit provided by the LMF. As further illustrated in the example of FIG. 5, at 530, the RAN may report the position estimation and the derived integrity metric to the LMF.

Figure 6:
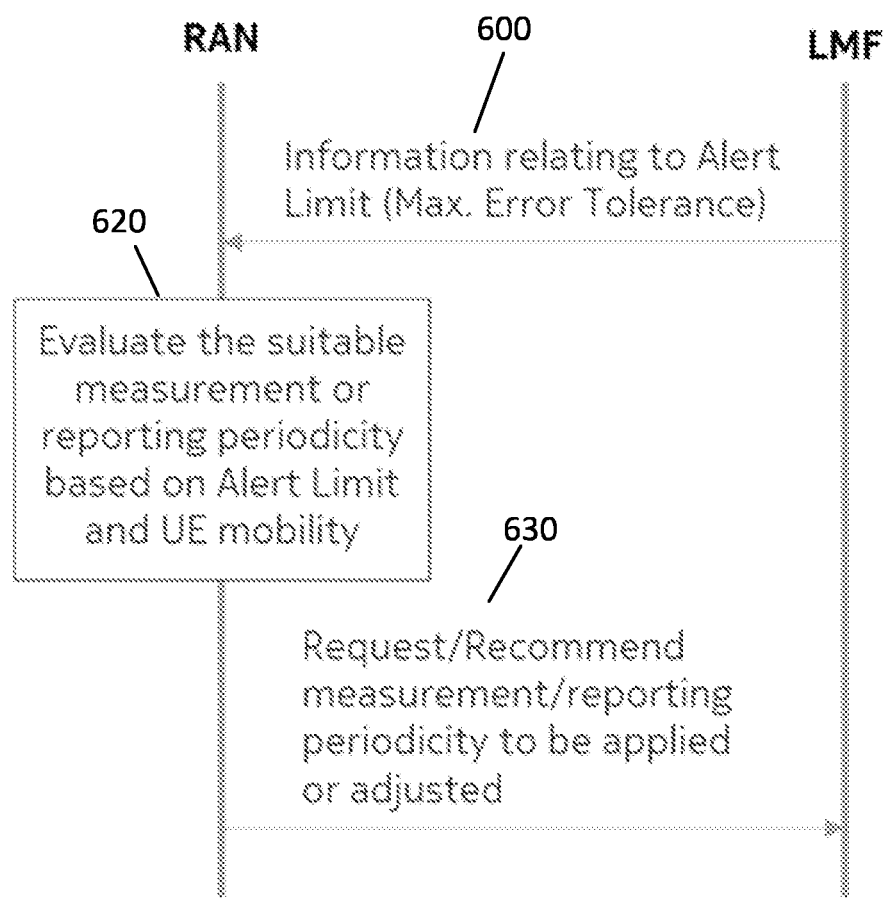
FIG. 6 illustrates an example signaling flow diagram, according to an embodiment.

A further embodiment may be directed to a method for measurement and/or reporting periodicity adjustment. As described above, UE mobility can cause integrity risk, as the position changes over time and therefore the position estimation may become outdated when it is actually used. One way to alleviate such an issue is that the RAN may request the location server to adjust the measurement and/or reporting periodicity based on the mobility level of the target device. In particular, the measurement periodicity can be directly related to the PRS/SRS periodicity. In this embodiment, the LMF may first provide information relating to the AL, and the RAN may evaluate how frequently the measurement should be conducted and reported to keep the error below the AL, based on the mobility of the target device. FIG. 6 illustrates an example signaling flow diagram according to this embodiment.

As illustrated in the example of FIG. 6, at 600, the LMF may optionally provide the AL of the client that needs the positioning information to the RAN. Upon reception of such information, at 620, the RAN may, based on the mobility level of the target device, evaluate whether the measurement periodicity (e.g., PRS/SRS periodicity) or reporting periodicity should be updated to make sure the PL is always below AL, in order to maintain normal operation without integrity risk. As further illustrated in the example of FIG. 6, at 630, the RAN may request or recommend to the LMF to apply or adjust the measurement and/or reporting periodicity. For example, when the mobility level is low, the RAN may suggest, to the LMF, making measurement and/or reporting less frequent to improve spectral efficiency.

Figure 7:
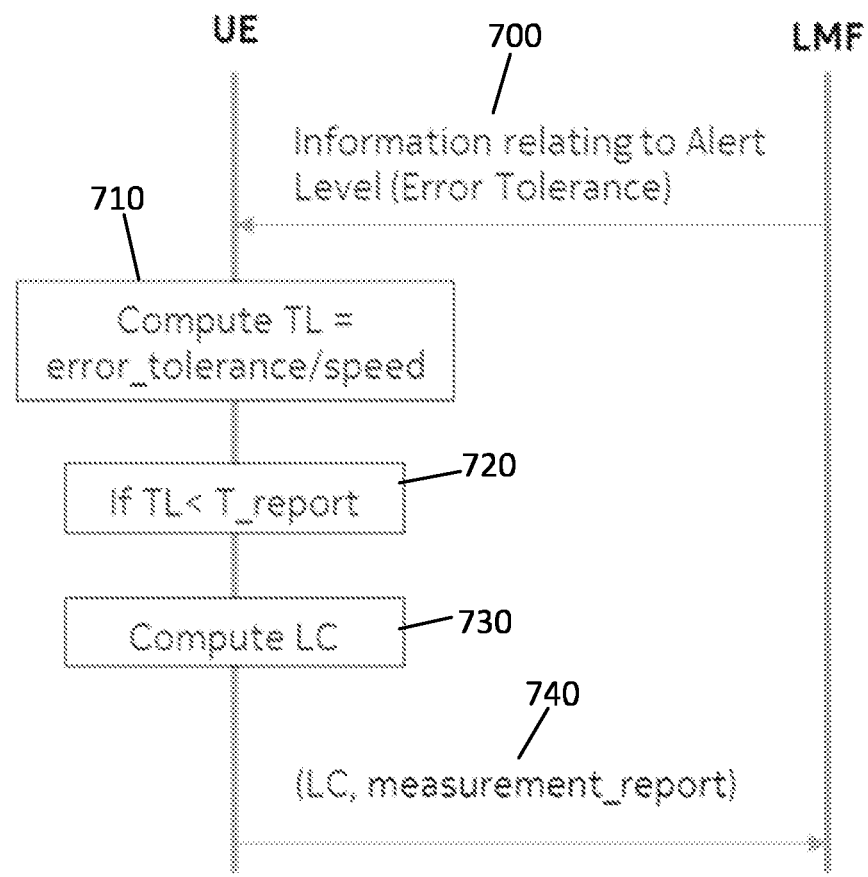
FIG. 7 illustrates an example signaling flow diagram, according to an embodiment.

An embodiment may be directed to a method for a UE-based location correction report. According to this embodiment, when the UE knows or has estimated or obtained its own velocity from sensors, the UE can compute an own timing limit (TL), i.e., a time window within which the position estimates remain valid, such as the expiry time discussed above. FIG. 7 illustrates an example signaling flow diagram according to this embodiment.

As illustrated in the example of FIG. 7, at 700, the LMF may provide the UE with an AL message containing at least the error tolerance. In an embodiment, at 710, the UE may compute the TL. The error tolerance metric may be used by the UE to compute TL and perform the check against T_report. For example, the TL may be derived as the ratio between the LMF reported error tolerance and the UE speed, e.g., where TL=error_tolerance/speed. The T_report may be a pre-scheduled periodic time-interval (fixed) (e.g., as is the case in the LTE positioning protocol (LPP)), or the T_report may be a UE-specific past reporting interval that may have become deprecated as the UE changed from one mobility level to another.

Continuing with the example of FIG. 7, at 720, if the reporting periodicity T_report is larger than TL meaning that the initial position estimate has expired and the report integrity is compromised (i.e., estimated location-related information becomes deprecated by the time the UE reports it to the LMF), then the UE may compute a location correction (LC) at 730. For UE-based positioning, LC may be a vector of position deltas expressed as a function of time, e.g., [Δx(t), Δy(t), Δz(t)]. It is noted that this vector is an example for a Cartesian coordinate system, but other examples may be used, e.g., where correction terms may be given in local tangent plane coordinates. Alternatively, for UE-assisted positioning, LC may include a set of time-dependent time of arrival (TOA), reference signal time difference (RSTD) values, measured reference signal receive power (RSRP) values, or measured angle values correction terms. At 740, the UE may report the LC to the LMF.

It should be noted that the example embodiments of FIGS. 4-7, as discussed above, may be combined in any suitable manner.

Figure 8A:
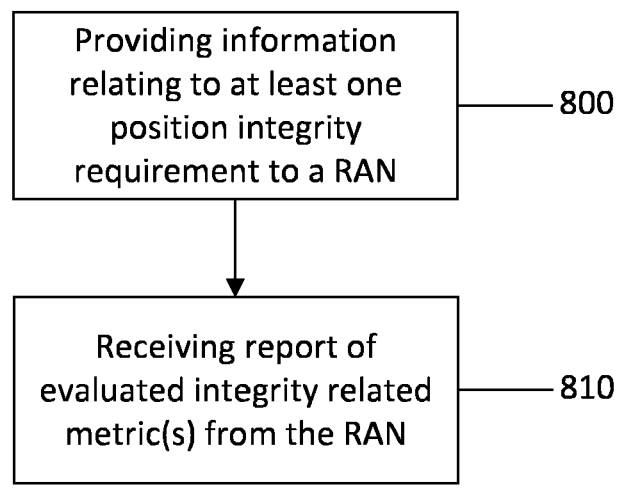
FIG. 8*a* illustrates an example flow diagram of a method, according to an embodiment.

FIG. 8a illustrates an example flow diagram of a method for reporting of integrity-related information for positioning, according to an embodiment. In certain example embodiments, the flow diagram of FIG. 8a may be performed by a network entity or network node in a communication system, such as LTE or 5G NR. For instance, in some example embodiments, the network node performing the method of FIG. 8*a* may include a location server or LMF, or the like.

As illustrated in the example of FIG. 8*a*, the method may include, at 800, transmitting or providing information relating to at least one positioning integrity requirement to one or more RAN node(s) (e.g., gNB, TRP or UE). In an embodiment, the information relating to the at least one positioning integrity metric may include AL of a client or device that requires positioning information. Additionally or alternatively, the method may include transmitting a request for at least one integrity metric that the RAN node should report. According to an embodiment, the method may include, at 810, receiving a report of one or more evaluated integrity-related metrics from the RAN node. In one embodiment, the report may further include measurement reporting, e.g., in the case where the position estimation is performed at the location server.

According to certain embodiments, the transmitting 800 may include transmitting a request for expiry time (or validity duration) to the RAN node and the receiving 810 may include receiving the expiry time from the RAN node, where the expiry time indicates the time period during which the reported information can be considered trustable, as shown in the example signaling flow of FIG. 4.

In some embodiments, the transmitting 800 may include transmitting a request for a certain integrity metric and the receiving 810 may include receiving a protection level (PL) or an indication of whether there is a risk with regards to a PL (e.g., an estimated error). In this case, according to an embodiment, the method may include evaluating if there is an integrity risk based on the received protection level, as shown in the example signaling flow of FIG. 5.

According to certain embodiments, the receiving 810 may include receiving a request or recommendation, from the RAN node, to apply or adjust the measurement and/or reporting periodicity, as shown in the example signaling flow of FIG. 6.

In some embodiments, the receiving 810 may include receiving a location correction (LC) and/or measurement report from the RAN node, as shown in the example signaling flow of FIG. 7.

Figure 8B:
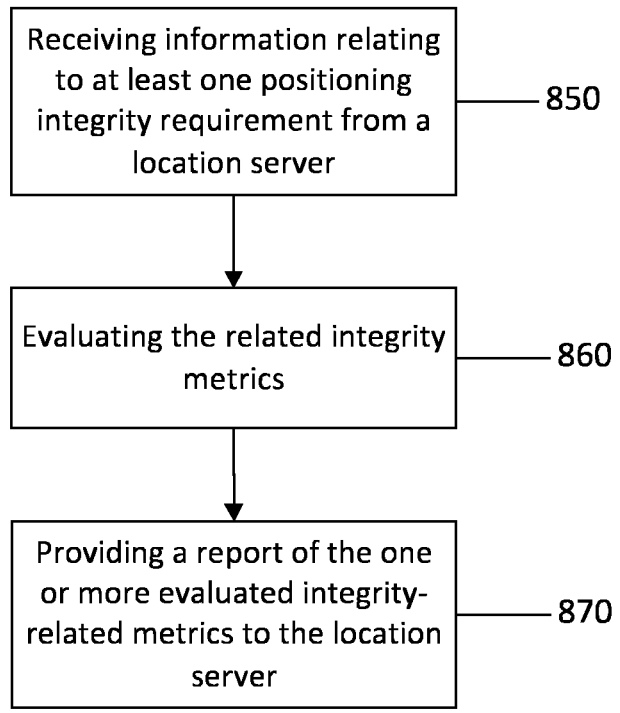
FIG. 8*b* illustrates an example flow diagram of a method, according to an embodiment.

FIG. 8*b* illustrates an example flow diagram of a method for reporting of integrity-related information for positioning, according to an embodiment. In certain example embodiments, the flow diagram of FIG. 8*b* may be performed by a network entity or network node in a communication system, such as LTE or 5G NR. For instance, in some example embodiments, the network node performing the method of FIG. 8*b* may include a base station, access node, eNB, gNB, RAN node and/or NG-RAN node, TRP, UE, mobile station, mobile device, IoT device, sensor, or the like.

As illustrated in the example of FIG. 8*b*, the method may include, at 850, receiving information relating to at least one positioning integrity requirement from a location server or LMF. In an embodiment, the information relating to the at least one positioning integrity metric may include AL of a client or device that requires positioning information. Additionally or alternatively, the method may include receiving a request for at least one integrity metric that should be reported to the location server or LMF.

According to an embodiment, the method of FIG. 8*b* may further include, at 860, evaluating the related integrity metrics based on the positioning integrity requirement provided by the location server or LMF and/or based on factors affecting the integrity of the positioning estimate. For example, such factors affecting the integrity of the positioning estimate may include mobility of the UE, properties of radio propagation, and/or perceived legitimacy of one or more RAN nodes. The properties of radio propagation may include a presence or strength of LoS path.

In an embodiment, the method may also include, at 870, providing a report of the one or more evaluated integrity-related metrics to the location server or LMF. In one embodiment, the report may further include measurement reporting, e.g., in the case where the position estimation is performed at the location server or LMF.

According to certain embodiments, the receiving 850 may include receiving a request for expiry time (or validity duration). In this embodiment, the evaluating 860 may include performing position measurement or estimation and deriving the expiry time. For example, the expiry time may be derived based on factors, such as UE mobility and propagation environment, and/or the AL provided by the location server. According to this embodiment, the transmitting 870 may include providing the position measurement/estimation and the expiry time to the location server or LMF.

In some embodiments, the receiving 850 may include receiving a request for a certain integrity metric. According to this embodiment, the evaluating 860 may include performing position measurement or estimation and deriving the requested integrity metric, such as a PL. In this case, the transmitting 870 may include transmitting the PL or an indication of whether there is a risk with regards to a PL (e.g., an estimated error) to the location server or LMF.

According to certain embodiments, the evaluating 860 may include evaluating whether the measurement periodicity (e.g., PRS/SRS periodicity) or reporting periodicity should be updated to ensure that the PL is below the AL, e.g., to maintain normal operation without integrity risk. In this embodiment, the transmitting 870 may include transmitting a request or recommendation, to the location server or LMF, to apply or adjust the measurement and/or reporting periodicity. For example, when the mobility level is low, the recommendation may include recommending the make measurement and/or reporting less frequent to improve spectral efficiency.

In some embodiments, the receiving 850 may include receiving an AL message containing at least the error tolerance. According to this embodiment, the evaluating 860 may include using the error tolerance to compute TL and to perform a check against the reporting periodicity (T_report), as discussed above in connection with FIG. 7. When the reporting periodicity is larger than the TL, then the evaluating 860 may further include computing a location correction (LC), and the transmitting 870 may include transmitting the LC and/or measurement report to the location server or LMF.

Figure 9A:
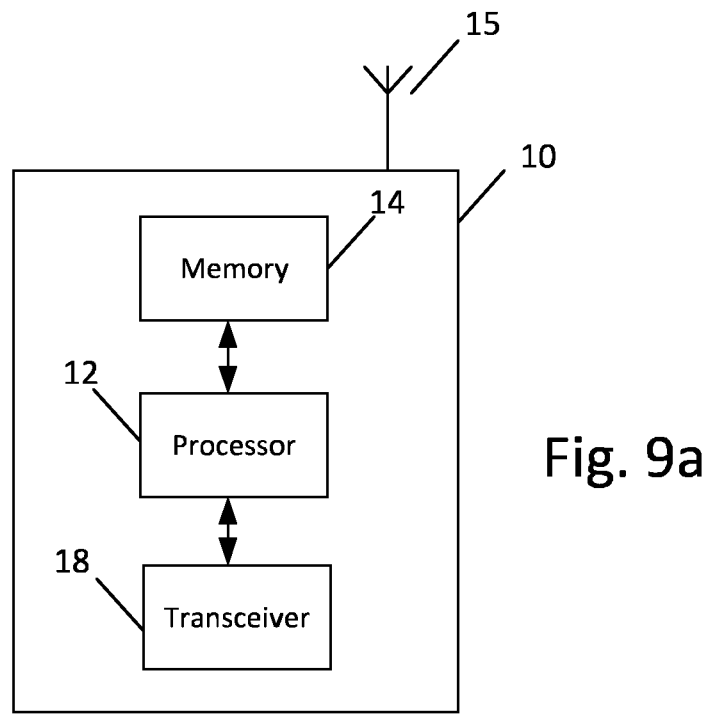
FIG. 9*a* illustrates an example block diagram of an apparatus, according to an embodiment.

FIG. 9*a* illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), high altitude platform station (HAPS), integrated access and backhaul (IAB) node, and/or WLAN access point, associated with a radio access network, such as a LTE network, 5G or NR. In some embodiments, apparatus 10 may be a UE, mobile station, mobile device, IoT device, sensor, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a.

As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 9a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, HAPS, IAB node, WLAN access point, UE, mobile device, mobile station, IoT device, or the like. In some embodiments, as discussed herein, apparatus 10 may be configured to perform a procedure relating to reporting of integrity-related information for positioning. For example, in some embodiments, apparatus 10 may be configured to perform one or more of the processes depicted in any of the flow charts or signaling diagrams described herein, such as those illustrated in FIG. 3-7 or 8b. For example, according to certain embodiments, apparatus 10 may be configured to perform any of the steps or procedures performed by the RAN or UE in FIGS. 3-7 or in FIG. 8b.

According to an embodiment, apparatus 10 may be controlled by memory 14 and processor 12 to receive information relating to at least one positioning integrity requirement from a location server or LMF. In an embodiment, the information relating to the at least one positioning integrity metric may include AL of a client or device that requires positioning information. Additionally or alternatively, apparatus 10 may be controlled by memory 14 and processor 12 to receive a request for at least one integrity metric that should be reported to the location server or LMF.

According to an embodiment, apparatus 10 may be controlled by memory 14 and processor 12 to evaluate the related integrity metrics based on the positioning integrity requirement provided by the location server or LMF and/or based on factors affecting the integrity of the positioning estimate. For example, such factors affecting the integrity of the positioning estimate may include mobility of the UE and a presence of LoS path.

In an embodiment, apparatus 10 may be controlled by memory 14 and processor 12 to provide a report of the one or more evaluated integrity-related metrics to the location server or LMF. In one embodiment, the report may further include measurement reporting, e.g., in the case where the position estimation is performed at the location server or LMF.

According to certain embodiments, apparatus 10 may be controlled by memory 14 and processor 12 to receive a request for expiry time (or validity duration). In this embodiment, apparatus 10 may be controlled by memory 14 and processor 12 to perform position measurement or estimation and deriving the expiry time. For example, the expiry time may be derived based on factors, such as UE mobility and propagation environment, and/or the AL provided by the location server. According to this embodiment, apparatus 10 may be controlled by memory 14 and processor 12 to provide the position measurement/estimation and the expiry time to the location server or LMF.

In some embodiments, apparatus 10 may be controlled by memory 14 and processor 12 to receive a request for a certain integrity metric. According to this embodiment, apparatus 10 may be controlled by memory 14 and processor 12 to perform position measurement or estimation and deriving the requested integrity metric, such as a PL. In this case, apparatus 10 may be controlled by memory 14 and processor 12 to transmit the PL or an indication of whether there is a risk with regards to a PL (e.g., an estimated error) to the location server or LMF.

According to certain embodiments, apparatus 10 may be controlled by memory 14 and processor 12 to evaluate whether the measurement periodicity (e.g., PRS/SRS periodicity) or reporting periodicity should be updated to ensure that the PL is below the AL, e.g., to maintain normal operation without integrity risk. In this embodiment, apparatus 10 may be controlled by memory 14 and processor 12 to transmit a request or recommendation, to the location server or LMF, to apply or adjust the measurement and/or reporting periodicity. For example, when the mobility level is low, the recommendation may include recommending the make measurement and/or reporting less frequent to improve spectral efficiency.

In some embodiments, apparatus 10 may be controlled by memory 14 and processor 12 to receive an AL message containing at least the error tolerance. According to this embodiment, apparatus 10 may be controlled by memory 14 and processor 12 to use the error tolerance to compute TL and to perform a check against the reporting periodicity (T_report), as discussed above in connection with FIG. 7. When the reporting periodicity is larger than the TL, then apparatus 10 may be controlled by memory 14 and processor 12 to compute a location correction (LC), and to transmit the LC and/or measurement report to the location server or LMF.

Figure 9B:
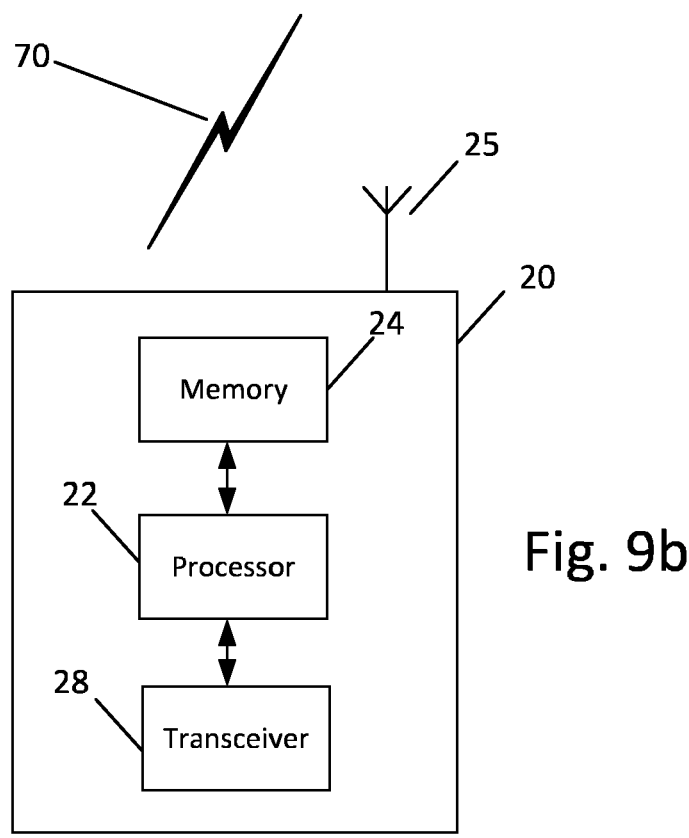
FIG. 9*b* illustrates an example block diagram of an apparatus, according to an embodiment.

FIG. 9b illustrates an example of an apparatus 20 according to another embodiment. In an embodiment, apparatus 20 may be a node, host, or server in a communications network or associated with a network, such as a LTE network, 5G or NR. For instance, in certain embodiments, apparatus 20 may be a server, such as a location server or LMF.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 (or processing means) for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media, or other storage means. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 (or transceiving means) configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device) or input/output means. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a server, such as a location server or LMF, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 3-7 or FIG. 8a. In certain embodiments, apparatus 20 may be configured to perform or execute procedure(s) relating to reporting of integrity-related information for positioning.

In an embodiment, apparatus 20 may be controlled by memory 24 and processor 22 to transmit or provide information relating to at least one positioning integrity requirement to a RAN node (e.g., gNB or UE). In an embodiment, the information relating to the at least one positioning integrity metric may include AL of a client or device that requires positioning information. Additionally or alternatively, apparatus 20 may be controlled by memory 24 and processor 22 to transmit a request for at least one integrity metric that the RAN node should report. According to an embodiment, apparatus 20 may be controlled by memory 24 and processor 22 to receive a report of one or more evaluated integrity-related metrics from the RAN node. In one embodiment, the report may further include measurement reporting, e.g., in the case where the position estimation is performed at the location server.

According to certain embodiments, apparatus 20 may be controlled by memory 24 and processor 22 to transmit a request for expiry time (or validity duration) to the RAN node and to receive the expiry time from the RAN node, where the expiry time indicates the time period during which the reported information can be considered trustable.

In some embodiments, apparatus 20 may be controlled by memory 24 and processor 22 to transmit a request for a certain integrity metric and to receive a protection level (PL) or an indication of whether there is a risk with regards to a PL (e.g., an estimated error). In this case, according to an embodiment, apparatus 20 may be controlled by memory 24 and processor 22 to evaluate whether there is an integrity risk based on the received protection level.

According to certain embodiments, apparatus 20 may be controlled by memory 24 and processor 22 to receive a request or recommendation, from the RAN node, to apply or adjust the measurement and/or reporting periodicity.

In some embodiments, apparatus 20 may be controlled by memory 24 and processor 22 to receive a location correction (LC) and/or measurement report from the RAN node.

Therefore, certain example embodiments provide several technological improvements, enhancements, and/or advantages over existing technological processes and constitute an improvement at least to the technological field of wireless network control and management. For instance, example embodiments can facilitate a location server or LMF to obtain integrity-related information associated with a positioning session from a RAN or RAN node, as the RAN has better knowledge relating to factors that could affect the positioning integrity performance Thus, certain embodiments can avoid a situation in which the LMF misuses the results that may have integrity risk, as well as providing timely warning if the result is only valid within a certain time frame. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
    transmitting at least one positioning integrity requirement to at least one radio access network node; and
    receiving a report of one or more evaluated integrity-related metrics from the at least one radio access network node, the report comprising information relating to an expiry time for the one or more evaluated integrity-related metrics.

2. The method according to claim 1, wherein the at least one positioning integrity metric comprises an alert limit of at least one client, application, or device that requires positioning information.

3. The method according to claim 2, wherein the alert limit comprises a maximum position estimation error that is tolerable by the at least one client, application, or device.

4. The method according to claim 1, further comprising transmitting a request for at least one integrity metric that the at least one radio access network node should report.

5. The method according to claim 1, wherein the report comprises measurement or positioning estimate reporting.

6. The method according to claim 1, wherein the transmitting comprises transmitting a request for expiry time to the at least one radio access network node and the receiving comprises receiving the expiry time from the at least one radio access network node, wherein the expiry time indicates the time period during which the reported information can be considered trustable.

7. The method according to claim 1, wherein the transmitting comprises transmitting a request for a certain integrity metric and the receiving comprises receiving a protection level or an indication of whether there is an integrity risk with regards to a protection level.

8. The method according to claim 7, wherein the protection level comprises an estimate of a maximum possible positioning error.

9. The method according to claim 7, further comprising evaluating if there is an integrity risk based on the received protection level.

10. The method according to claim 1, wherein the receiving comprises receiving a request or recommendation, from the at least one RAN node, to apply or adjust the measurement and/or reporting periodicity.

11. The method according to claim 1, wherein the measurement periodicity comprises a transmission periodicity of at least one reference signal.

12. The method according to claim 1, wherein the receiving comprises receiving a location correction or measurement report from the at least one radio access network node.

13. The method according to claim 1, wherein the at least one radio access network node comprises at least one of a gNB, transmission-reception point, or user equipment.

14. A method, comprising:
    receiving at least one positioning integrity requirement from a location server or location management function;
    evaluating integrity metrics based on the positioning integrity requirement provided by the location server or location management function or based on factors affecting an integrity of a positioning estimate; and
    transmitting a report of the one or more evaluated integrity-related metrics to the location server or location management function, the report comprising information relating to an expiry time for the one or more evaluated integrity-related metrics.

15. The method according to claim 14, wherein the at least one positioning integrity metric comprises an alert limit of at least one client, application, or device that requires positioning information.

16. The method according to claim 15, wherein the alert limit comprises a maximum position estimation error that is tolerable by the at least one client, application, or device.

17. The method according to claim 14, further comprising receiving a request for at least one integrity metric that should be reported to the location server or location management function.

18. The method according to claim 14, wherein the factors affecting the integrity of the positioning estimate comprises at least one of mobility of the user equipment, properties of radio propagation, or perceived legitimacy of at least one radio access network node.

19. The method according to claim 18, wherein the properties of radio propagation comprise presence or strength of line of sight path.

20. The method according to claim 14, wherein the report further comprises measurement reporting in the case where the position estimation is performed at the location server or location management function.

21. The method according to claim 14, wherein:
the receiving comprises receiving a request for expiry time;
the evaluating comprises performing position measurement or estimation and deriving the expiry time; and
the transmitting comprises transmitting the position measurement or estimation and the expiry time to the location server or location management function.

22. The method according to claim 21, wherein the expiry time is derived based on factors including at least one of mouser equipment mobility and properties of propagation environment, or the alert limit provided by the location server.

23. The method according to claim 14, wherein:
the receiving comprises receiving a request for a certain integrity metric;
the evaluating comprises performing position measurement or estimation and deriving the requested integrity metric including a protection level; and
the transmitting comprises transmitting the protection level or an indication of whether
there is an integrity risk with regards to a protection level to the location server or location management function.

24. The method according to claim 14, wherein:
the evaluating comprises evaluating whether the measurement periodicity or reporting periodicity should be updated to ensure that the protection level is below the alert limit.

25. The method according to claim 14, wherein:
the receiving comprises receiving a message containing at least a maximum error tolerance;
the evaluating comprises using the error tolerance to compute a timing limit and to perform a check against the reporting periodicity; and
when the reporting periodicity is larger than the timing limit, the evaluating further comprises computing a location correction; and
the transmitting comprises transmitting the location correction or measurement report to the location server or location management function.

26. The method according to claim 25, wherein the location correction comprises at least one of a set of time-dependent time of arrival, reference signal time difference values, measured reference signal receive power values, or measured angle values correction terms.

27. An apparatus, comprising:
at least one processor; and
at least one memory comprising computer program code,
the at least one memory and computer program code configured, with the at least one processor, to cause the apparatus at least to:
transmit at least one positioning integrity requirement to at least one radio access network node; and
receive a report of one or more evaluated integrity-related metrics from the at least one radio access network node, the report comprising information relating to an expiry time for the one or more evaluated integrity-related metrics.

28. A non-transitory computer readable medium encoded with instructions that, when executed in hardware, perform a process, the process comprising:
transmitting at least one positioning integrity requirement to at least one radio access network node; and
receiving a report of one or more evaluated integrity-related metrics from the at least one radio access network node, the report comprising information relating to an expiry time for the one or more evaluated integrity-related metrics.

* * * * *

UNITED STATES PATENT AND TRADEMARK OFFICE
CERTIFICATE OF CORRECTION

| | | |
|---|---|---|
| PATENT NO. | : 11,933,908 B2 | Page 1 of 1 |
| APPLICATION NO. | : 17/389206 | |
| DATED | : March 19, 2024 | |
| INVENTOR(S) | : Ping-Heng Kuo et al. | |

It is certified that error appears in the above-identified patent and that said Letters Patent is hereby corrected as shown below:

In the Claims

In Column 17, Line 34, Claim 22, delete "mouser" and insert -- user --, therefor.

Signed and Sealed this
Twenty-second Day of October, 2024

Katherine Kelly Vidal
*Director of the United States Patent and Trademark Office*